United States Patent

Erickson

[11] Patent Number: 6,000,306
[45] Date of Patent: Dec. 14, 1999

[54] SIDE ACTIVATED TOOL UNIT CLAMPING APPARATUS USING MECHANICAL ADVANTAGE

[75] Inventor: Robert A. Erickson, Raleigh, N.C.

[73] Assignee: Kennametal Inc., Latrobe, Pa.

[21] Appl. No.: 09/096,735

[22] Filed: Jun. 12, 1998

[51] Int. Cl.[6] .................................................. B23B 29/04
[52] U.S. Cl. ............................ 82/160; 82/158; 409/233
[58] Field of Search ........................... 82/157, 158, 160; 409/233, 234

[56] References Cited

U.S. PATENT DOCUMENTS

| | | | |
|---|---|---|---|
| 1,861,099 | 5/1932 | Smith | 279/75 |
| 2,926,020 | 2/1960 | Dayton et al. | 279/75 |
| 4,209,182 | 6/1980 | Sheldon | 279/75 |
| 4,708,040 | 11/1987 | Erickson . | |
| 4,723,877 | 2/1988 | Erickson | 409/234 |
| 4,726,268 | 2/1988 | Erickson . | |
| 4,726,269 | 2/1988 | Erickson . | |
| 4,736,659 | 4/1988 | Erickson . | |
| 4,747,735 | 5/1988 | Erickson et al. | 409/234 |
| 4,836,068 | 6/1989 | Erickson | 82/160 |
| 4,932,295 | 6/1990 | Erickson | 82/160 |
| 4,951,536 | 8/1990 | Robertson | 82/158 |
| 4,981,057 | 1/1991 | Von Haas et al. | 82/160 |
| 5,016,892 | 5/1991 | Lafforgue et al. | 279/82 |
| 5,173,017 | 12/1992 | Oshnock et al. | 82/160 |
| 5,193,954 | 3/1993 | Hunt | 409/233 |
| 5,245,896 | 9/1993 | Erickson et al. | 82/160 |
| 5,261,302 | 11/1993 | Erickson et al. | 82/160 |
| 5,352,074 | 10/1994 | Ishikawa | 409/232 |
| 5,415,066 | 5/1995 | Erickson et al. | 82/160 |
| 5,694,820 | 12/1997 | Erickson et al. | 82/160 |

FOREIGN PATENT DOCUMENTS

| | | | |
|---|---|---|---|
| 874855 | 4/1953 | Germany | 279/75 |
| 2934428 | 3/1981 | Germany . | |
| 3606331 | 9/1987 | Germany | 279/75 |
| 3829331 | 3/1990 | Germany | 279/905 |
| 3837007 | 5/1990 | Germany | 82/160 |

*Primary Examiner*—Andrea L. Pitts
*Assistant Examiner*—Henry W. H. Tsai
*Attorney, Agent, or Firm*—John J. Prizzi

[57] ABSTRACT

A side activated clamping mechanism is disclosed for detachably connecting a tool unit to a tool support housing. The tool unit has a shank with openings which are engaged by locking elements extending radially from apertures in a canister mounted within the tool support housing. Mechanical advantage of the locking elements may be increased by angling the locking element contact surfaces relative to one another. The locking elements are driven along a ball track on a reciprocating lock rod. To accommodate the angle between the contact surfaces, the ball track must be angled.

10 Claims, 9 Drawing Sheets

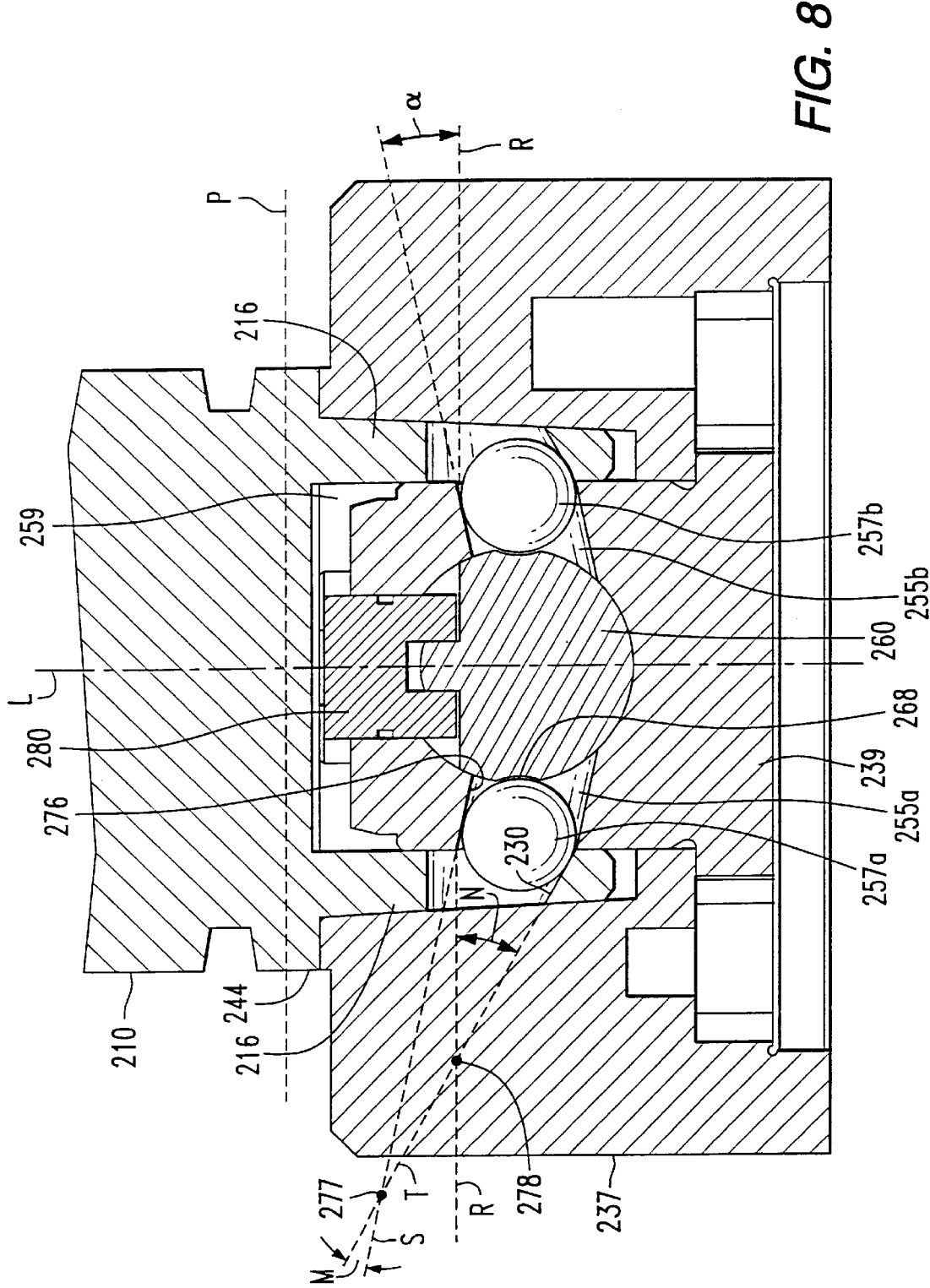

SIDE ACTIVATED TOOL UNIT CLAMPING APPARATUS USING MECHANICAL ADVANTAGE

BACKGROUND OF THE INVENTION

1. Field of the Invention

This invention generally relates to an improved lock rod clamping apparatus for detachably connecting a tool unit to a tool supporter, and is particularly concerned with a side activated clamping apparatus using mechanical advantage.

2. Description of the Prior Art

Clamping mechanisms for detachably connecting a tool unit to a tool supporter are well known in the art. Such mechanisms are typically used in machining operations where the tool unit holds a cutting insert that is moved into and out of cutting engagement with a rotating metal workpiece. The clamping apparatus allows different tool units holding different cutting inserts to be quickly attached to and detached from the tool supporter which in turn is connected to a device that controls the movement of the tool unit with respect to the workpiece.

One of the most commercially successful clamping mechanisms includes a cylindrically-shaped canister that is mateable with the tubular shank of a tool unit and which includes apertures for admitting locking elements into locking engagement with recesses present in the tool unit. The locking elements, which are typically spherical, are radially moved through the apertures in the canister by means of a reciprocating lock rod having cam portions that engage the locking elements. Examples of such a clamping mechanism are disclosed in Erickson U.S. Pat. Nos. 4,708,040; 4,747,735; 4,836,068, and 4,932,295, each of which is assigned to Kennametal Inc. located in Latrobe, Pa.

Such a clamping mechanism is illustrated in FIG. 1. Here, a side cross-sectional view of the distal end 53 of a canister 39 is shown which includes an aperture 54a in the form of a cylindrical bore through the wall of the member 39. The inner diameter of the circular bore forming the aperture 54a closely approximates the outer diameter of the spherical locking element 57a. The lock rod 60 includes a cam portion 64a having a spherical depression 66 which tapers off into a ramp 68. When the spherical locking element 57a is seated in the depression 66, and the stop flange 70 of the lock rod 60 abuts annular wall 71, the spherical element 57a is in a non-locking position which would allow the tubular shank 16 of a tool unit 10 to be inserted into the annular recess 59 of the coupling member 43. However, when the lock rod 60 is moved to the right in the position illustrated, the ramp 68 of the cam portion 64a wedgingly engages and raises the spherical locking element 57a into the locking position. In such a position, the spherical locking element 57a will wedgingly and lockingly bear against an angled aperture wall 30 of the tool unit 10.

The prior art tool unit 10 as illustrated in FIGS. 2 and 3 includes a forward end 12 for holding a cutting tool, and a rearward tubular shank 16 for connection to a tool supporter. The forward end 12 includes a recess or pocket 14 which is conventional in design for receiving an indexable cutting insert, locking bracket, and shim (not shown). At the junction between the forward end 12 and the tubular shank 16 is an annular abutment face 17 for engagement with the annular face of a tool supporter when the tool unit is connected to such a supporter by way of a clamping mechanism. The abutment face 17 is planar and is orthogonally oriented with respect to the longitudinal axis L of the tubular shank 16.

As is indicated in FIG. 3, the tubular shank 16 has a frusto-conical shape and includes a pair of opposing openings 18a,b for receiving spherical locking elements of the clamping mechanism which is described hereinafter. The walls 20 of the openings 18a,b are, in part, cylindrical around their circumference and angled (as shown in FIG. 3) for facilitating the locking engagement between the shank 16 and the spherical locking elements of the clamping mechanism. The inner surface 22 of the tubular shank 16 is substantially cylindrical in shape to closely mate with the outer surface of the canister of the locking mechanism. The shank outer surface 24 is frusto-conical for the purposes of both centering and stiffening the coupling between the tool unit 10 and a tool supporter. Disposed orthogonally with respect to the opposing openings 18a,b are alignment slots 26 and 28. As will be explained, these slots 26,28 fit into protruding keys (not shown) present in the canister of the clamping mechanism to ensure alignment between the openings 18a,b with the spherical locking elements of the clamping mechanism.

With reference now to FIG. 4, a prior art clamping mechanism 35 is disposed within a prior art tool supporter 37 as shown. The clamping mechanism 35 includes a cylindrically shaped canister 39 mounted within a housing 41 formed from a coupling member 43. The coupling member 43 terminates, at its distal end, in an annular abutment face 44 that confronts the previously discussed abutment face 17 of the tool unit 10 when the coupling member 43 and tool unit 10 are connected. The tool support housing 37 further has a housing member 45 disposed behind the coupling member 43. The canister 39 is affixed to the housing 41 by way of an annular flange 47 secured to the coupling member 43 by bolts 49. Coupling member 43 is in turn secured to the housing member 45 by means of bolts 51. Thus the canister 39 remains stationary relative to the lock rod 60 during the operation of the clamping mechanism 35.

The distal end 53 of the canister 39 includes a pair of opposing apertures 55a,b for admitting locking elements 57a,b in the form of spheres. The locking elements 57a,b are illustrated in solid lines to show their position when the clamping mechanism is unlocked and in phantom lines to show their position when the coupling is in the locked position. It is important to note that the walls of the apertures 55a,b are cylindrical bores having an inner diameter that is slightly larger than the outer diameter of the locking spheres 57a,b. The distal end 53 of the canister 39 also includes the previously mentioned pair of alignment lugs (not shown) disposed at right angles to the apertures 55a,b. A frusto-conically shaped annular recess 59 is defined between the outer surface of the distal end 62 of the canister 39, and the inner surface of the coupling member 43 for receiving the tool unit 10.

In addition to the canister 39 and locking spheres 57a,b, the clamping mechanism 35 of the invention further includes lock rod 60 which is reciprocally movable along an axis A into the position illustrated in phantom. The lock rod 60 has a distal end 62 concentrically disposed within and slidably movable with respect to the distal end 53 of the canister 39. The distal end 62 of the lock rod 60 includes opposing cam portions 64a,b for radially moving the locking spheres 57a,b into and out of the annular recess 59. To this end, each of the cam portions 64a,b includes a depression 66 which is partially complementary in shape to the spheres 57a,b, and a ramp 68 extending from one side of the depression 66 toward the distal end 62 of the lock rod 60. The cam portion 64 defines the path of the locking elements along the lock rod. This path is also known as the ball track.

Lock rod 60 further has an integrally formed stop flange 70 that engages an annular wall 71 of the canister 39 to arrest the stroke of the lock rod 60 in the distal direction. The proximal end 63 of the lock rod 60 is formed from a cylindrical shaft 72 slidably mounted within the proximal end of the canister 39. Shaft 72 terminates in a spring retainer 73. A spring pack formed from stacked Belleville washers 74 constantly applies a tensile force to the spring retainer 73 that biases the lock rod 60 in the locking position illustrated in phantom.

The distal end 62 of the lock rod 60 is used to physically bump the tool unit 10 from the coupling member 43 when the tool unit 10 is to be released. For that reason, if the tool unit 10 must be pushed out of the coupling member 43 for release, then the distal end of the lock rod 60 must be positioned relative to the tool unit 10 for such contact.

The clamping mechanism 35 operates by applying a force and moving the lock rod 60 to the left against the force of the spring pack washers 74. The tubular shank 16 (FIG. 3) of the tool unit 10 is inserted into the annular recess 59 and by removing the applied force on the lock rod 60, the spring pack washers 74 will force the lock rod 60 to the right, causing the locking elements 57a,b to move radially outwardly along the ramps 68 (FIG. 1) and to engage the angled wall 30 of the opening 18a of the tool unit shank 16.

In this prior art design, aperture 54a of the canister 39 is a cylindrical bore extending perpendicular to the longitudinal axis L of the clamping mechanism 35.

It has been discovered that by angling the canister aperture wall located opposite the angled wall 30 of the tool unit shank 16, the clamping force on the tool unit 10 may be increased over that of a non-angled wall using the same force on a lock rod 60 having the same ramp angle. Directing attention to FIG. 5, this is accomplished by tilting the aperture wall 76, which is opposite aperture wall 75. The aperture wall 76 of each of the canister apertures 55a,b is tilted similarly to the aperture wall 75. More specifically, wall 76 is tilted at an angle between about 10° and 20°, preferably 15°, with respect to axis R which extends radially from the longitudinal axis L. Such a tilting of the aperture wall 76 has the advantage of increasing the gripping force of the clamping mechanism 35.

A clamping mechanism utilizing this arrangement is disclosed in U.S. Pat. No. 5,694,820 which is assigned to Kennametal Inc. and hereby incorporated by reference.

The increased clamping force is best understood with reference to angles M and N shown in FIG. 5. Where the locking sphere 57a is pushed radially outwardly into the locked position illustrated in FIG. 5, its spherical walls engage both the angle portion 30 of the aperture walls of the tool unit 10 and the tilted wall 76 of the aperture 55a at an angle M. Angle M is defined by the projection of lines from aperture wall 76 and the angled portion of the tool unit aperture walls 30. This projection intersects at origin 77.

On the other hand, angle N is defined by line R, which reflects the previous orientation of aperture wall 76 and the angled portion of the tool unit aperture walls 30. The locking sphere 57a wedgingly engages these surfaces, by forced displacement from the ramp 68 of the lock rod 60. Since angle M is smaller than angle N, the locking sphere 57a generates a greater mechanical advantage between those surfaces defined by angle M than those defined by angle N. This modified arrangement provides a clamping force on the order of 30% higher than that clamping force generated with the original arrangement.

While such a prior art clamping mechanism provides increased clamping forces for an arrangement in which the lock rod moves longitudinally in the clamping mechanism housing, in many clamping mechanisms the lock rod is operated from the side of the clamping mechanism. U.S. Pat. No. 4,736,659 is directed to such a side activated mechanism and is co-assigned to Kennametal Inc. and Krupp Widia GmbH and hereby incorporated by reference. Such side activated clamping mechanisms, as they currently exist, are not operational using a canister having apertures with angled walls. The angled walls of the canister cause the locking balls to move along the longitudinal axis of the clamping mechanism and this movement would force the balls off the ball track of a side activated lock rod.

It would be advantageous if a design were available by which the mechanical advantage heretofore discussed would be available to side activated clamping mechanisms.

SUMMARY OF THE INVENTION

The invention is a side activated clamping mechanism for detachably connecting along a longitudinal axis a tool unit to a tool support housing. The tool unit received within the clamping mechanism has a shank with openings and associated walls. For reference a plane of orientation is defined as perpendicular to the longitudinal axis. The clamping mechanism is comprised of at least one locking element, a canister that is mateable with the tool unit and which includes an aperture for admitting the locking element and a lock rod that is reciprocally movable along a first axis radial to the longitudinal axis and having a ball track for moving the locking element through the canister aperture from an unlocked position into locking engagement with the tool unit. The aperture of the canister has a wall which opposes the wall of the opening in the tool unit shank. The canister wall is along a second axis radial to the longitudinal axis and forms a positive angle with the plane of orientation. The positive angle formed by the second axis between the canister wall and the shank opening wall is smaller than an angle formed between the shank opening wall and a line parallel to the plane of orientation.

The second axis along the canister wall forms an angle with the plane of orientation of between 10 and 30 degrees.

The ball track of the clamping mechanism may be angled relative to the plane or orientation to permit the locking element to follow the ball track as the locking element moves through the canister aperture. This angle may be between 1–10 degrees with the plane of orientation.

While in one embodiment the lock rod reciprocates along the first axis, it is also possible for the lock rod to reciprocate along an axis parallel to the ball track.

The clamping mechanism may further include a torque screw threadably mated and rotatably mounted within the tool support housing. The torque screw is attached to the lock rod such that rotation of the torque screw reciprocally moves the lock rod.

BRIEF DESCRIPTION OF THE DRAWINGS

FIG. 8 is a cross-sectional elevation view of the side-activated clamping mechanism in FIG. 7 taken along lines 8—8;

DETAILED DESCRIPTION OF THE INVENTION

Figure 6:
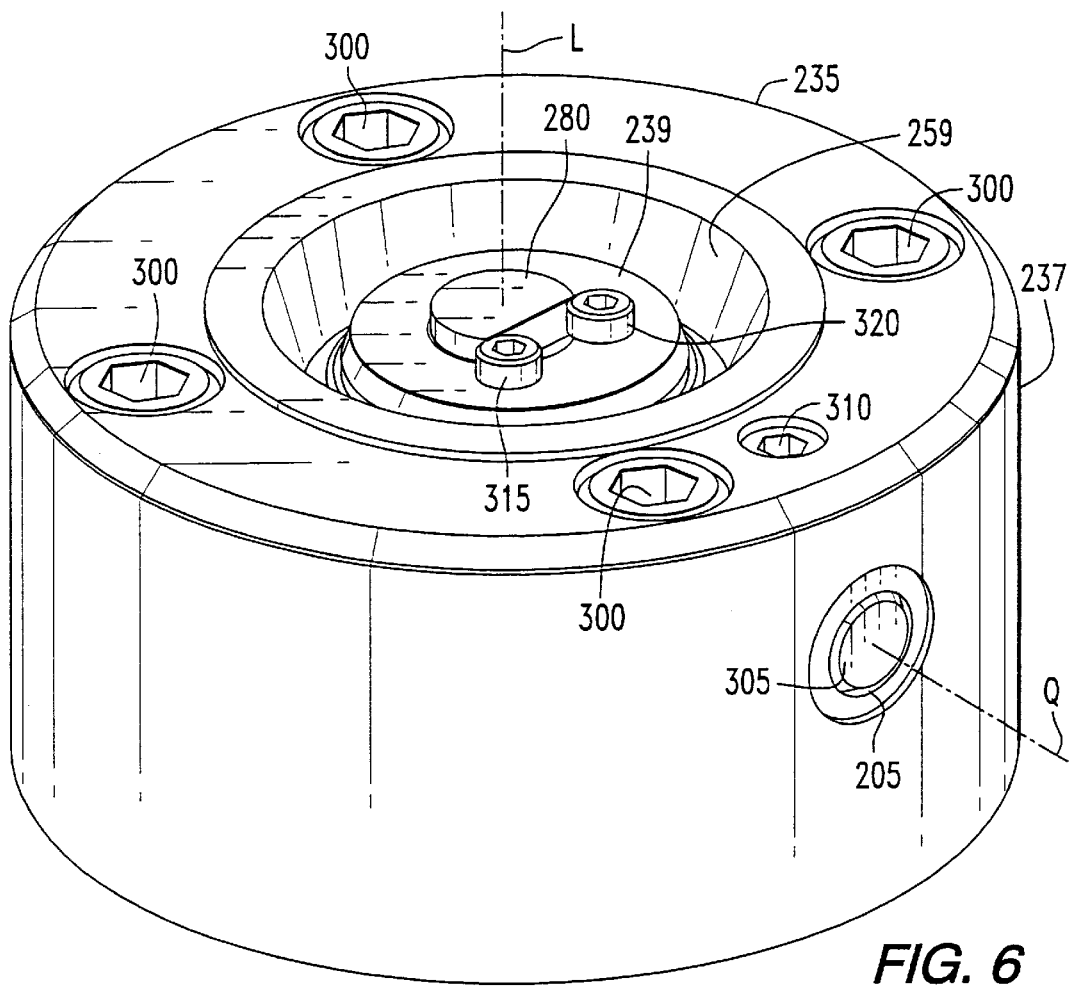
FIG. 6 is a perspective view of the side-activated clamping mechanism in accordance with the subject invention.
Figure 10:
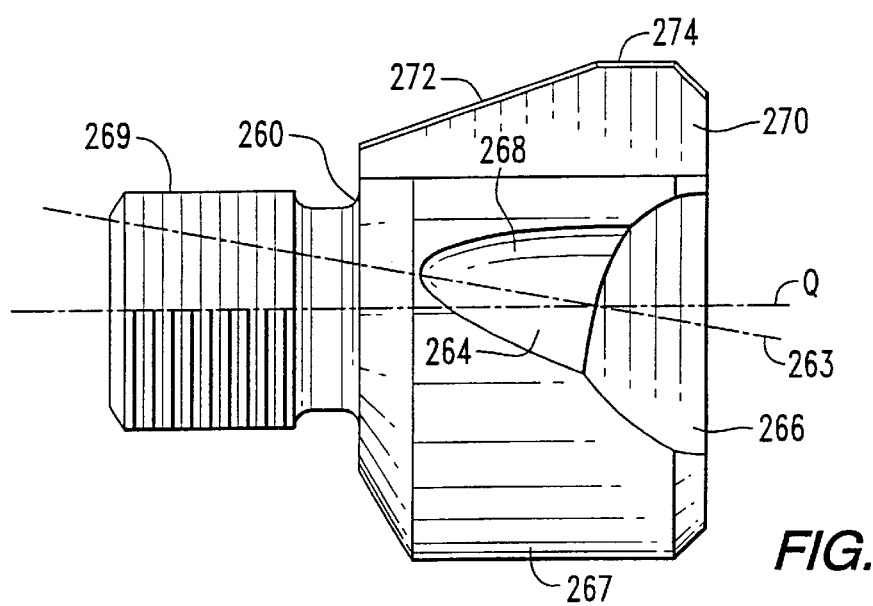
FIG. 10 is a side view of the lock rod in accordance with the subject invention.

FIG. 6 illustrates a perspective view of a clamping mechanism 235 for detachably connecting along a longitudinal axis L a tool unit identical to that tool unit 10 previously discussed to a tool supporter. The clamping mechanism 235 is side activated by a lock rod 260 (FIG. 10) not shown in FIG. 6 but mounted in a location diametrically opposed to cylindrical bore 205 illustrated in FIG. 6. The shank 16 of the tool unit 10 (FIG. 2) extends into the annular recess 259 and openings 18a,b of the tool unit 10 are engaged by the locking elements 257a,b (FIG. 7) within the annular recess 259 of the clamping mechanism 235.

Figure 7:
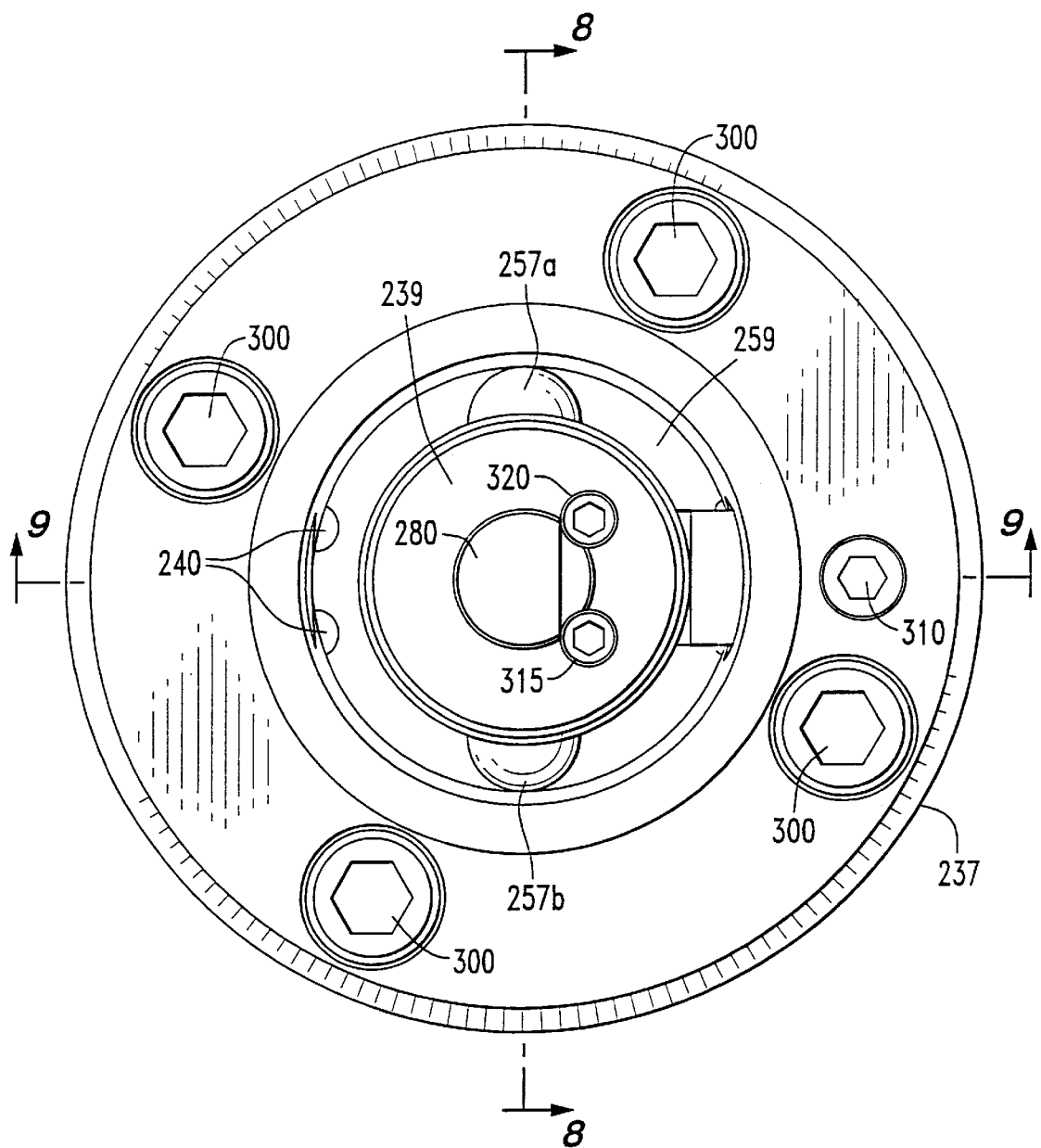
FIG. 7 is a top view of the side-activated clamping mechanism in accordance with the subject invention.

FIG. 7 illustrates a top view of the perspective drawing presented in FIG. 6. The tool support housing 237 may be a single integral piece or may be comprised of parts connected to one another using technology well-known to those skilled in the art of metal fabrication.

FIG. 8 illustrates a cross section of the clamping mechanism 235 taken along lines 8—8 in FIG. 7. The clamping mechanism 235 is generally symmetric about the longitudinal axis L and therefore, while reference will be made using "a" and "b" suffixes in reference items on different sides of the longitudinal axis L, it should be understood in the absence of such suffixes, the these parts are identical.

The canister 239 is secured to the tool support housing 237 using bolts (not shown) which extend through attachment bores 240 (FIG. 7). As previously mentioned, the locking elements 257a,b are urged radially outwardly from the longitudinal axis L by the lock rod 260, which in FIG. 8 reciprocates in and out of the page. A portion of the shank 216 of a tool unit 210 has been drawn to show a locked assembly. The only moving parts in FIG. 8 for the purposes of explaining this invention are the locking elements 257a,b, the lock rod 260 and the bump-off member 280.

The lock rod 260, through its reciprocation in and out of the page, may displace locking elements 257a,b radially outwardly from the longitudinal axis L to engage the shank 216 of the tool unit 210 or, in the alternative, may displace the bump-off member 280 upwardly, thereby displacing the tool unit from the locked position. The cross-section illustrated in FIG. 8 shows the lock rod 260 in the locked position with the locking elements 257a,b radially extended.

Of particular interest in FIG. 8 are the opposing apertures 255a,b in the canister 239. For purposes of convenience, a plane of orientation P, which will be perpendicular to the longitudinal axis L and designated as P, will be identified. As illustrated in FIG. 8, the axis R is parallel to the plane of orientation and for convenience angles will be referenced relative to axis R. The apertures 255a,b, just as in the prior art, are along a second axis S oriented at an angle α of about 10°–20°, and preferably 15° to the plane of orientation P. As a result, when the locking elements 257a,b are displaced radially outwardly by the lock rod 260, they are also displaced toward the abutment face 244 of the clamping mechanism 235. This design, as previously discussed, provides the enhanced mechanical force previously unavailable with apertures that were not angled in this manner.

Applying this to the arrangement in FIG. 8, the increased clamping force is highlighted with reference to angles M and N shown in FIG. 8. Where the locking sphere 257a is pushed radially outwardly into the locked position illustrated in FIG. 8, its spherical walls engage both the angled portion 230 of the aperture walls of the tool unit 210 and the angled wall 276 of the aperture 255a at an angle M. Angle M is defined by the projection of axis S from aperture wall 276 and a line along the angled portion of the tool unit aperture wall 230 defined as axis T. This projection intersects at origin 277.

On the other hand, angle N is defined by axis R, which reflects the prior art orientation of aperture wall 276, and the angled portion of the tool unit aperture walls 230. The tool unit aperture wall 230 may form an angle of about 30° with axis R. The locking sphere 257a wedgingly engages these surfaces by forced displacement from the ramp 268 of the lock rod 260. Since angle M is smaller than angle N, the locking sphere 257a generates a greater mechanical advantage between those surfaces defined by angle M than those defined by angle N. This modified arrangement provides a clamping force on the order of 30% higher than that clamping force generated with the prior art arrangement.

In the previous designs the lock rod traveled in the same longitudinal direction as the displaced locking elements 257 and therefore the locking elements 257 would follow the ball track on the lock rod. However, the locking elements 257 would be laterally shifted by the amount of displacement caused by the angled aperture. Since the prior art side activation devices had a ball track essentially parallel to the plane of orientation P illustrated in FIG. 8, angled apertures were never considered because the angled apertures would move the locking element 257 off the center of the ball track.

To accommodate this deviation and in the spirit of the subject invention the ball track 263 (FIGS. 9a, 9b, and 10) comprises a cam portion 264 having a depression 266 and a ramp 268 defining the ball track 263 which is oriented at an angle β (FIG. 9a) with a first axis Q parallel to the plane of orientation P. The angle β forms a non-zero, or a positive, angle with the first axis Q. Although not shown in FIGS. 9a and 9b, the locking element 257a moves along the ball track 263 as the lock rod 260 is moved back and forth along an axis Q parallel to the plane of orientation P as the locking element 257a is guided through the canister aperture 255a (FIG. 8). In this fashion, the locking element 257a (FIG. 8) follows the angular ball track 263 (FIGS. 9a,9b) throughout the range of travel of the locking element 257a in the aperture 255a of the canister 239 moving radially outwardly through the aperture 255a along second axis S.

The lock rod 260 has a head 267 which contains the cam portion 264, the depression 266 and the ramp 268 along with a bump-off tab 270 comprised of a ramp 272 and a flat 274. In the locked position illustrated in FIG. 9a, the lock rod is extended to the right and the locking elements 257a,b (not shown in FIG. 9a) are positioned on the ball track 263 at point 284 and are radially extended as illustrated in FIG. 8. In this position the bump-off member 280 is in a recessed position.

Figure 9A:
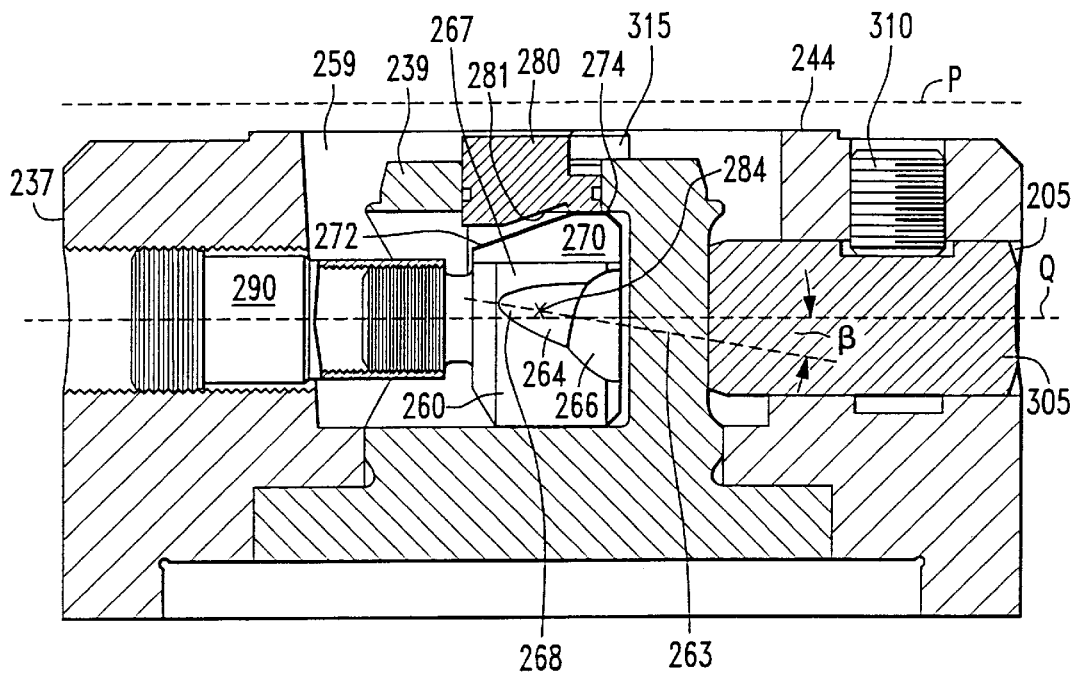
FIG. 9a is a cross-sectional view taken along arrows 9—9 in FIG. 7 illustrating the clamping mechanism in the locked position.
Figure 9B:
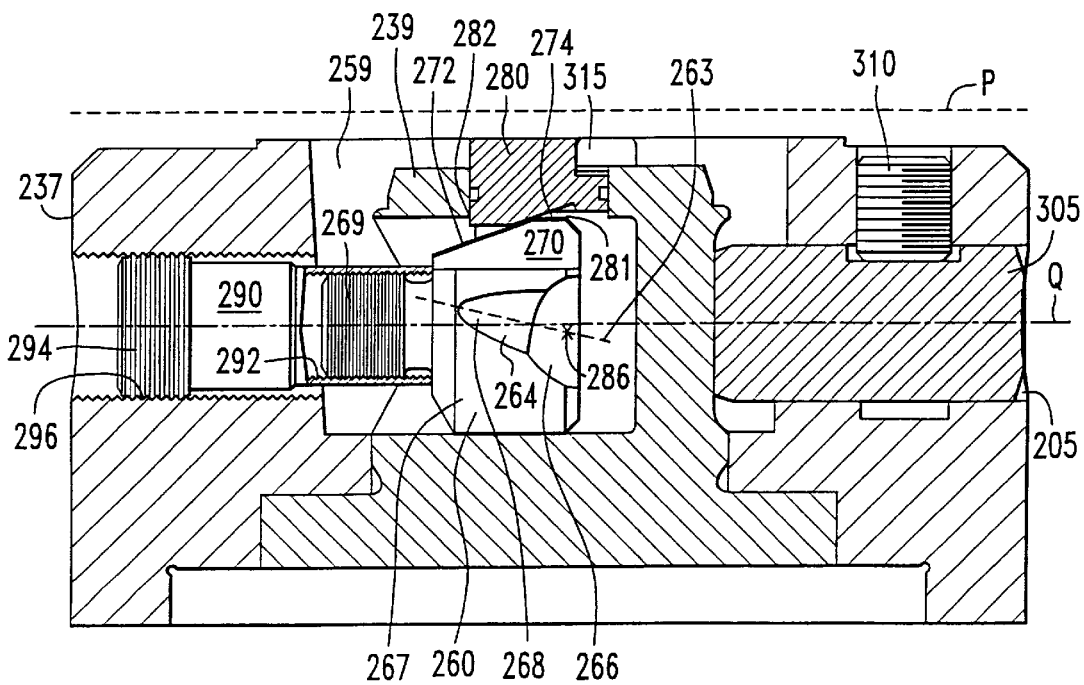
FIG. 9b is a cross-sectional view taken along arrows 9—9 in FIG. 7 illustrating the clamping mechanism in the released position.

When the lock rod 260 is moved to the left as illustrated in FIG. 9b to the released position, the locking elements 257a,b (not shown in FIG. 9b) are positioned approximately at point 286 along ball track 263, and the ramp 272 of the bump-off tab 270 engages the ramp 281 of the bump-off member 280 toward the bump-off member 280 radially outwardly. The lock rod 260 may continue moving to the left and the flat 274 of the bump-off tab 270 engages the flat 282 of the bump-off member 280 thereby contacting the body of the tool unit 210 (not shown) and physically forcing the tool unit 210 from the annular recess 259 of the canister 239.

Figure 11:
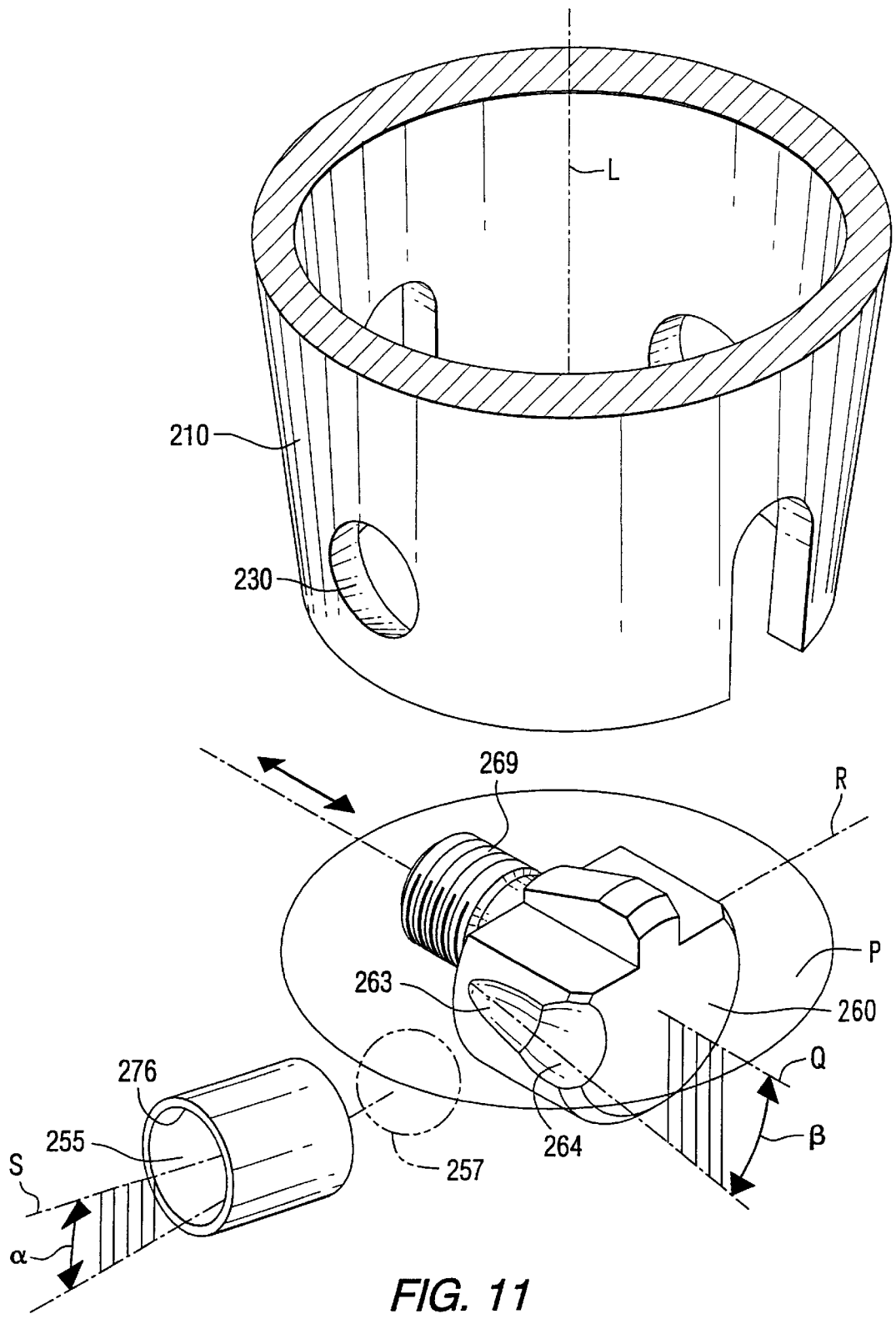
FIG. 11 is a perspective schematic view illustrating the relationship of components in the subject invention.

FIG. 11 illustrates a perspective sketch of one embodiment of the subject invention generally showing the tool unit 210 with a longitudinal axis L extending therethrough. Liberty has been taken with proportions and sizes for illustrative purposes. A plane of orientation P is shown as a circle perpendicular to the longitudinal axis L. A first axis Q extends radially from the longitudinal axis L through the lock rod tail 269. An axis R extends radially from the longitudinal axis L in a direction parallel to the plane of orientation P and is generally perpendicular to the first axis Q. The ball track 263 is at an angle β relative to the first axis Q. The angled aperture wall 276 of the canister 255 forms an angle of α with axis R to define a second axis S. A locking element 257 shown in phantom travels along the ball track 263 of the cam portion 264 to engage the angled aperture wall 276 of the canister 239 and the angled aperture wall 230 of the tool unit 210.

The lock rod 260 is reciprocated along axis Q using the lock rod tail 269 having a threaded outside diameter compatible with a threaded inside diameter 292 of a torque screw 290. The torque screw 290 furthermore has a threaded outside diameter 294 which is compatible with a threaded inside diameter 296 of the tool support housing 237. The pitch of the threaded internal diameter 292 and associated threads are significantly greater than that for the threaded outside diameter 294 and associated threads such that rotation of the torque screw 290 will move the lock rod 260 at a faster rate than the rate the torque screw 290 moves within the tool support housing 237. The torque screw 290 has at its open end a hexagonal cavity for ease of rotation using a hexagonal wrench.

It should be appreciated that FIGS. 9a and 9b illustrate a lock rod 260 moving along an axis Q parallel to the plane of orientation P. It is entirely possible for the lock rod 260 and the associated torque screw 290 to be oriented in a direction parallel to the ball track 263 such that the lock rod 260 does not travel along the axis Q but instead travels along a path identical to the ball path 263.

The angle β of the ball track 263 relative to the axis Q may range from between 1–10°. This angle is a function of the aperture 255a orientation within the canister 239 and the stroke length of the lock rod 260. In one instance in which the aperture 255a of the canister 239 forms an angle α of 15°, the ball track angle β may be 2° 48'. This calculation is also a function of the angle the ramp 268 of the lock rod 260 forms with the plane of orientation P.

The clamping mechanism 235 is mounted to a machine tool (not shown) using bolts 300 illustrated in FIG. 6 which extend through the thickness of the tool support housing 237. These bolts are for illustrative purposes and may need to be radially adjusted to avoid the moving components of the mechanism 235.

Figure 1:
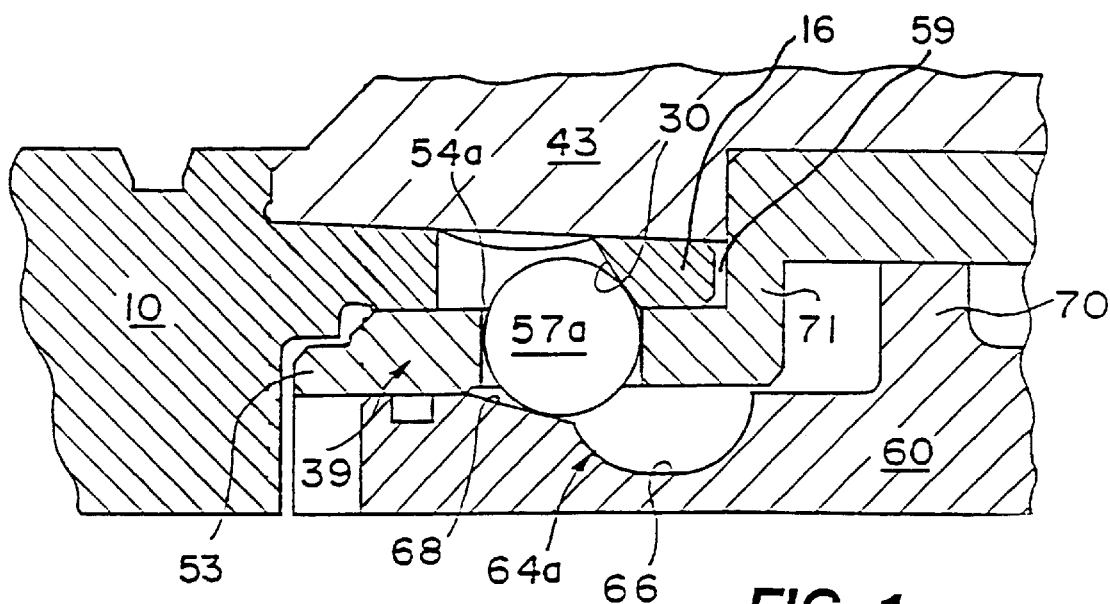
FIG. 1 is an enlarged cross-sectional side view of a canister, spherical locking element and cam portion of a lock rod in prior art clamping mechanisms.
Figure 2:
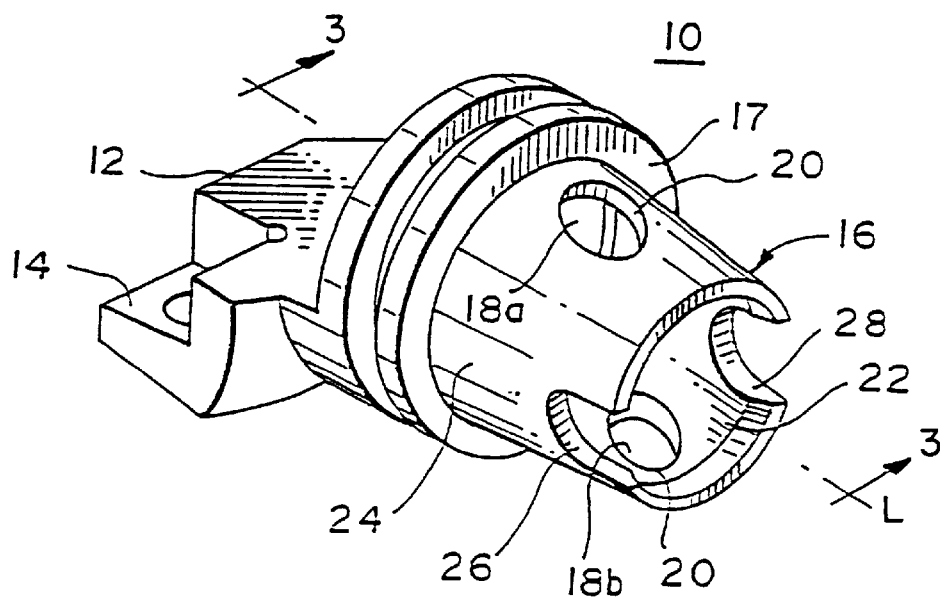
FIG. 2 is a perspective view of a prior art tool unit of the type secured by a clamping mechanism.
Figure 3:
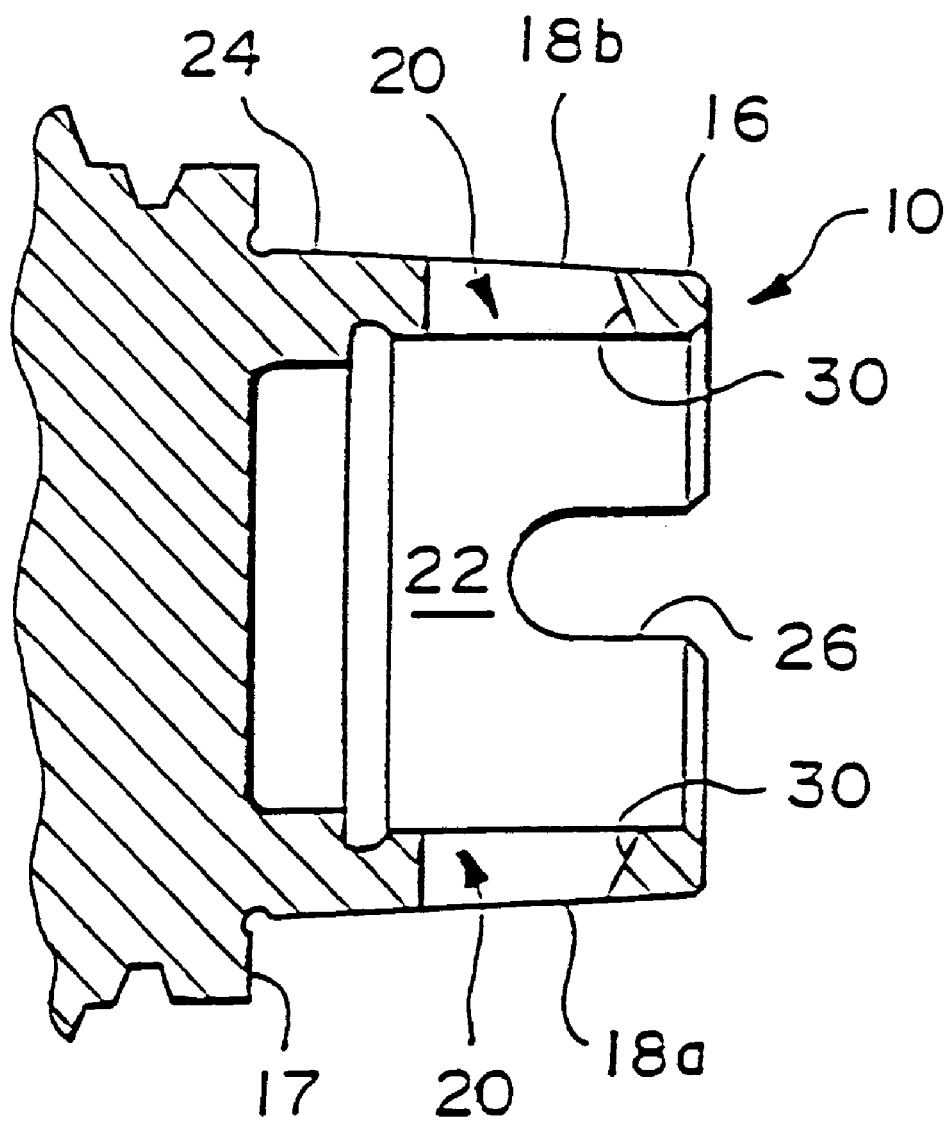
FIG. 3 is a cross-sectional side view of the prior art tool unit illustrated in FIG. 1 along lines 3—3.
Figure 4:
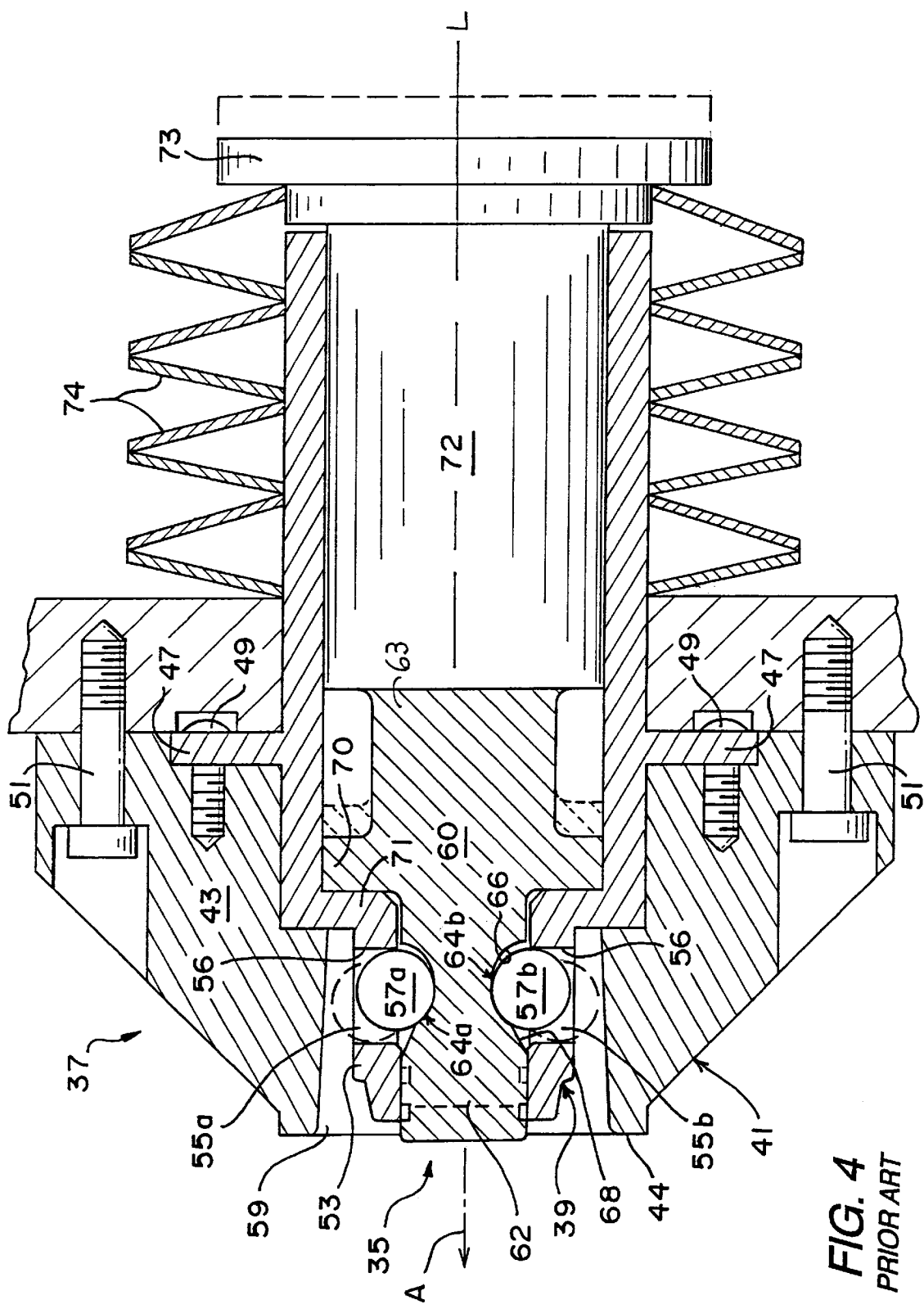
FIG. 4 is a side cross-sectional view of a prior art clamping mechanism that detachably connects the tool unit of FIGS. 1 and 2 to a tool supporter.
Figure 5:
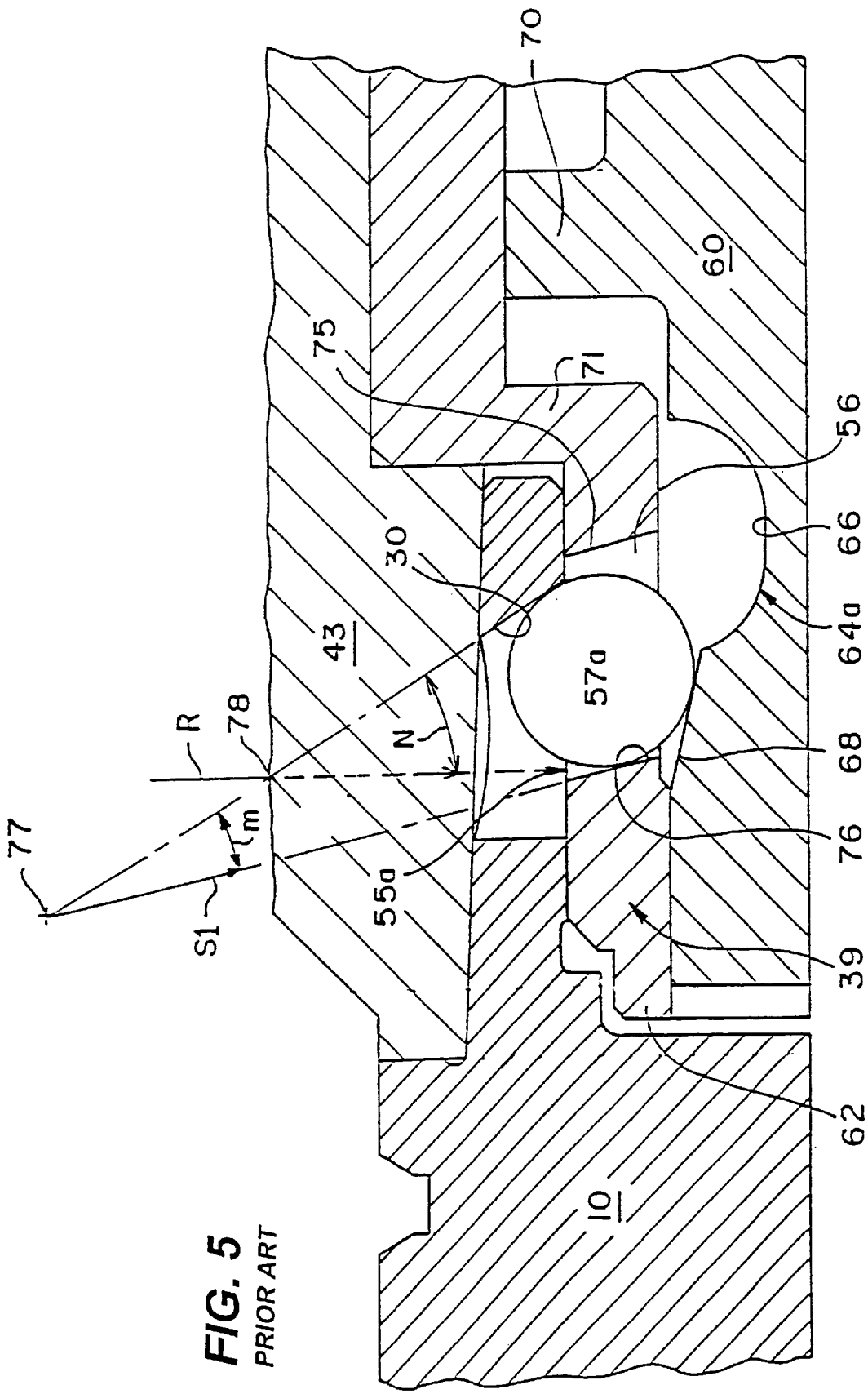
FIG. 5 is a partial enlarged cross-sectional side view of a prior art clamping mechanism in which the aperture walls are angled.

FIG. 2 illustrates alignment slots 26 and 28 of the tool unit 10. Tool unit 210 has similar slots and, as shown in FIGS. 9a and 9b, one such slot is engaged by the drive key 305 secured within the cylindrical bore by a retaining bolt 310.

As illustrated in FIG. 6, the bump-off member 280 is captured within the tool support housing 237 by two bolts 315 and 320.

Although this invention has been described with respect to preferred embodiments, various modifications, revisions and additions will become evident to persons of ordinary skill in the art. All such modifications, revisions and additions are intended to be encompassed in the scope of this invention which is limited only by the claims appended hereto.

What is claimed is:

1. A clamping mechanism for detachably connecting along a longitudinal axis a tool unit to a tool support housing, wherein the tool unit has a shank with openings and associated walls and wherein a plane of orientation P is perpendicular to the longitudinal axis L, comprised of:

a housing;

at lease one locking element;

a canister within the housing that is mateable with the tool unit and which includes an aperture for admitting the locking element, and a look rod that is reciprocally movable within the housing along a first axis Q radial to the longitudinal axis L and having a ball track for moving the locking element through the canister aperture from an unlocked position into locking engagement with the tool unit, wherein the aperture of the canister has a wall which opposes the wall of the opening in the tool unit shank and wherein the canister wall is along a second axis S radial to the longitudinal axis and forming a second axis angle α with the plane of orientation, wherein the second axis angle α is smaller than an angle N formed between an axis T extending from the shank opening wall and a line parallel to the plane of orientation, and wherein the ball track is angled relative to the plane of orientation to permit the locking element to follow the ball track as the locking element moves through the canister aperture.

2. The clamping mechanism of claim 1 wherein the second axis S along the canister wall forms an angle α with the plane of orientation of between 10 and 30 degrees.

3. The clamping mechanism of claim 2 wherein the second axis S along the canister wall forms an angle α with the plane of orientation of 15 degrees.

4. The clamping mechanism according to claim 1 wherein the ball track is angled between 1–10 degrees with the plane of orientation.

5. The clamping mechanism according to claim 4 wherein the ball track is angled between 2 and 3 degrees with the plane of orientation.

6. The clamping mechanism according to claim 1 wherein the lock rod reciprocates along an axis parallel to the ball track.

7. The clamping mechanism according to claim 1 wherein the ball track of the lock rod includes a depression for receiving the locking element in a non-locking position and a cam portion with a ramp adjacent to the depression the depression for radially and axially displacing the locking element to a locking position.

8. The clamping mechanism according to claim 1 wherein the first axis Q and the second axis S, when projected along the longitudinal axis upon the plan of orientation, are perpendicular to each another.

9. The clamping mechanism according to claim 1 further including a torque screw threadably mated and rotatably mounted within the tool support housing, wherein the torque screw is attached to the lock rod such that rotation of the torque screw reciprocally moves the lock rod.

10. The clamping mechanism according to claim 1 wherein the locking element is a spherical ball.

* * * * *